United States Patent Office 2,750,392
Patented June 12, 1956

2,750,392
PHENYLPYRIDYLALKANOLS

Francis E. Cislak, Indianapolis, Ind., assignor to Reilly Tar & Chemical Corporation, Indianapolis, Ind., a corporation of Indiana No Drawing. Application April 18, 1955,
Serial No. 502,247

10 Claims. (Cl. 260—297)

This invention relates to a new class of chemical compounds and to the process of making them. More particularly, it relates to phenylpyridylalkanols having the following general formula:

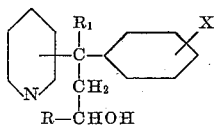

where R represents hydrogen or methyl, $R_1$ represents hydrogen, alkyl, aryl or alkaryl, and X represents halogen or hydrogen.

The phenylpyridylalkanols of this invention are efficient inhibitors for use in the pickling of metals with acids, such as hydrochloric and sulfuric acids. Some of them are important intermediates in the synthesis of organic compounds, for example, 4-(1,1-diphenylpropan-3-ol) pyridine is useful in the preparation of the pharmacologically active 4-(1,1-diphenylpropan-3-ol)piperidine.

In general, the compounds of my present invention may be prepared by reacting sodamide with a pyridine which has as a substituent the group —$CHR_1R_2$ (wherein $R_1$ represents hydrogen, alkyl, aryl, or alkaryl and $R_2$ represents phenyl or halogenophenyl) and then reacting the resulting sodiopyridine with ethylene oxide or propylene oxide.

My invention will be described more fully in conjunction with the examples given below.

EXAMPLE 1

*4-(1,1-diphenylpropan-3-ol)pyridine*

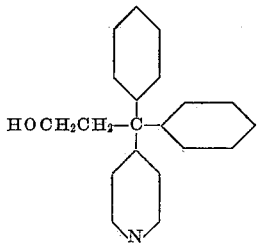

Thirty-four grams of finely divided sodamide, prepared in any suitable manner, are dispersed in 700 cc. of liquid ammonia. To this dispersion of sodamide in liquid ammonia is added 195 grams (0.8 mol) of diphenyl-4-pyridylmethane; the latter compound is added in small portions to more readily control the reaction. After all of the diphenyl-4-pyridylmethane has been added, the mixture is stirred for about another one-half to one hour. Then 31 grams (0.7 mol) of ethylene oxide are added in small portions. The reaction mixture is mechanically stirred during the addition of the ethylene oxide; the agitation is continued for from two to six hours after all of the ethylene oxide has been added. The 4-(1,1-diphenylpropan-3-ol)-pyridine formed during the reaction period is isolated in any suitable manner.

One way of isolating the 4-(1,1-diphenylpropan-3-ol)-pyridine is as follows: The ammonia is evaporated. Water is added to hydrolyse any unreacted sodamide or sodium derivative of the alkanol. Then hydrochloric acid is added to neutralize the resulting sodium hydroxide. Upon settling, two layers are formed, an aqueous layer and a water insoluble layer. The two layers are separated, and the water layer is extracted with benzene. The benzene extract is added to the water insoluble layer, and the 4-(1,1-diphenylpropan-3-ol)pyridine is separated from this mixture by fractional distillation under vacuum.

As so prepared, the 4-(1,1-diphenylpropan-3-ol)pyridine is pure enough to be used as is. For some uses, it may be desirable to purify the compound further by recrystallization or by vacuum distillation.

The reaction in liquid ammonia may be carried out at atmospheric pressure or it may be conducted at superatmospheric pressures. Commercially, it is preferred to use super atmospheric pressures of the order of 100–200 lbs./sq. in.

I have found it advantageous to react the diphenyl-4-pyridylmethane with the sodamide at a low temperature, even as low as −30° C. High temperatures, above about 60–80° C., are to be avoided as at the higher temperatures the sodamide may react with the diphenylpyridylmethane to give an aminopyridine.

While I prefer liquid ammonia as my reaction medium, I can use other media, such as dimethylaniline, diethylether, xylene, or the like.

EXAMPLE 2

*2-(1,1-diphenylpropan-3-ol)pyridine*

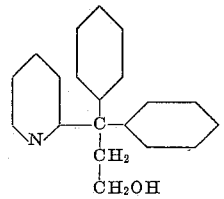

The procedure of Example 1 is followed, except that in place of the diphenyl-4-pyridylmethane, I use diphenyl-2-pyridylmethane. The 2-(1,1-diphenylpropan-3-ol)pyridine formed may be used as an intermediate for the preparation of quaternized heterocyclic color couplers for use in color photography.

EXAMPLE 3

*4-(1,1-diphenylbutan-3-ol)pyridine*

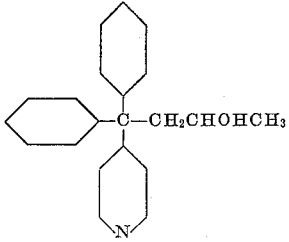

The procedure of Example 1 is followed, except that in place of the ethylene oxide, I use 0.7 mol of propylene oxide.

EXAMPLE 4

*2-(1-p-chlorophenylpropan-3-ol)pyridine*

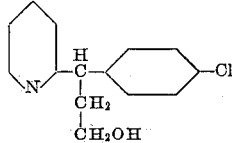

The procedure of Example 1 is followed except that in place of the diphenyl-4-pyridylmethane, I use 0.8 mol of 2-p-chlorobenzylpyridine. The 2-(1-p-chlorophenylpropan-3-ol)pyridine is a useful intermediate for the preparation of one of the more important antihistamines known as chlortrimeton. The equation below indicates a process, which is the subject of a co-pending application, for the preparation of chlortrimeton from 2-(1-p-chlorophenylpropan-3-ol)pyridine:

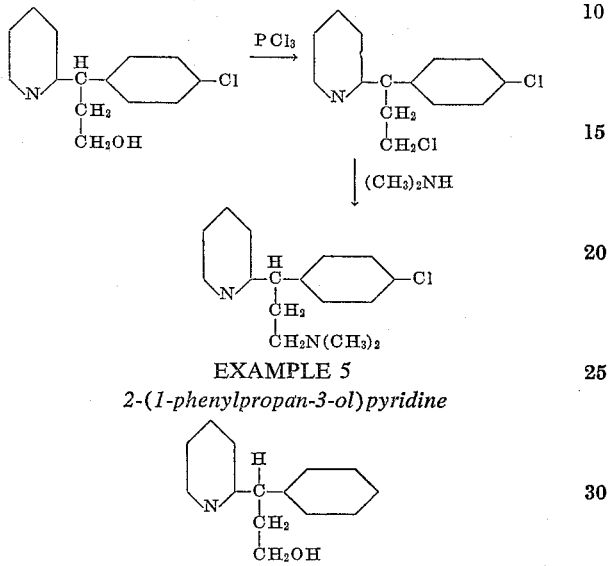

EXAMPLE 5

*2-(1-phenylpropan-3-ol)pyridine*

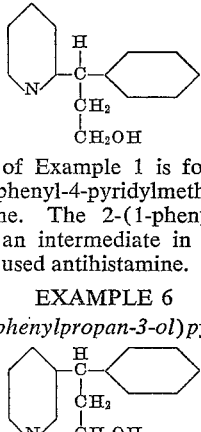

The procedure of Example 1 is followed except that in place of the diphenyl-4-pyridylmethane, I use 0.8 mol of 2-benzylpyridine. The 2-(1-phenylpropan-3-ol)pyridine is useful as an intermediate in the preparation of trimeton, a widely used antihistamine.

EXAMPLE 6

*3-(1-phenylpropan-3-ol)pyridine*

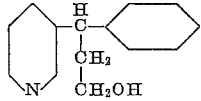

The procedure of Example 1 is followed except that in place of the diphenyl-4-pyridylmethane, I use 0.8 mol of 3-benzylpyridine.

EXAMPLE 7

*4-(1-methyl,1-p-bromophenylpropan-3-ol)pyridine*

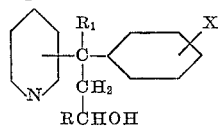

The procedure of Example 1 is followed except that in place of the diphenyl-4-pyridylmethane, I use 0.8 mol of 4-p-bromophenylmethylpyridylmethane.

The above examples are given by way of illustration of the manner in which my new compounds may be made. To those skilled in the art, many variations will occur.

I claim as my invention:

1. The class of compounds consisting of phenylpyridylalkanols having the general formula

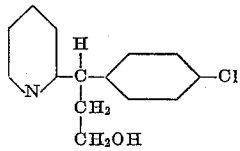

where R represents a member selected from the class of hydrogen and methyl, $R_1$ represents one of the class consisting of hydrogen, lower alkyl, phenyl, and benzyl, and X represents one of the class consisting of hydrogen and halogen.

2. The compound, 2-(1-p-chlorophenylpropan-3-ol)pyridine whose structural formula is:

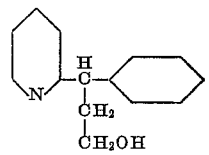

3. The compound, 2-(1-phenylpropan-3-ol)pyridine whose structural formula is:

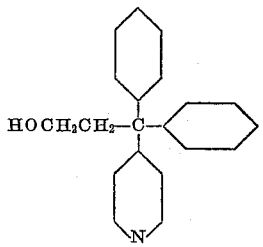

4. The compound, 4-(1,1-diphenylpropan-3-ol)pyridine whose structural formula is:

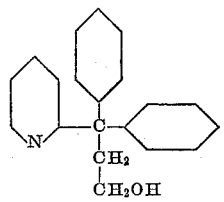

5. The compound 2-(1,1-diphenylpropan-3-ol)pyridine whose structural formula is:

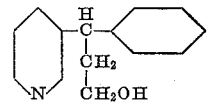

6. The compound 3-(1-phenylpropan-3-ol)pyridine whose structural formula is:

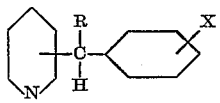

7. The process of preparing compounds of claim 1 which comprises reacting sodamide with a pyridine of the general formula where R represents one of the class consisting of hydrogen, lower alkyl, phenyl, and benzyl, X represents halogen, and then reacting the resulting compound with a member of the class consisting of ethylene oxide and propylene oxide.

8. The process of preparing the compound of claim 2 which comprises reacting sodamide with 2-p-chlorobenzylpyridine and then reacting the resulting compound with ethylene oxide.

9. The process of preparing the compound of claim 3 which comprises reacting sodamide with 2-benzylpyridine and then reacting the resulting compound with ethylene oxide.

10. The process of preparing the compound of claim 6 which comprises reacting sodamide with 3-benzylpyridine and then reacting the resulting compound with ethylene oxide.

No references cited.